Sept. 6, 1932. E. McKUEN 1,875,633
FEED FOR RESAW MACHINES
Filed Oct. 29, 1929 2 Sheets-Sheet 1
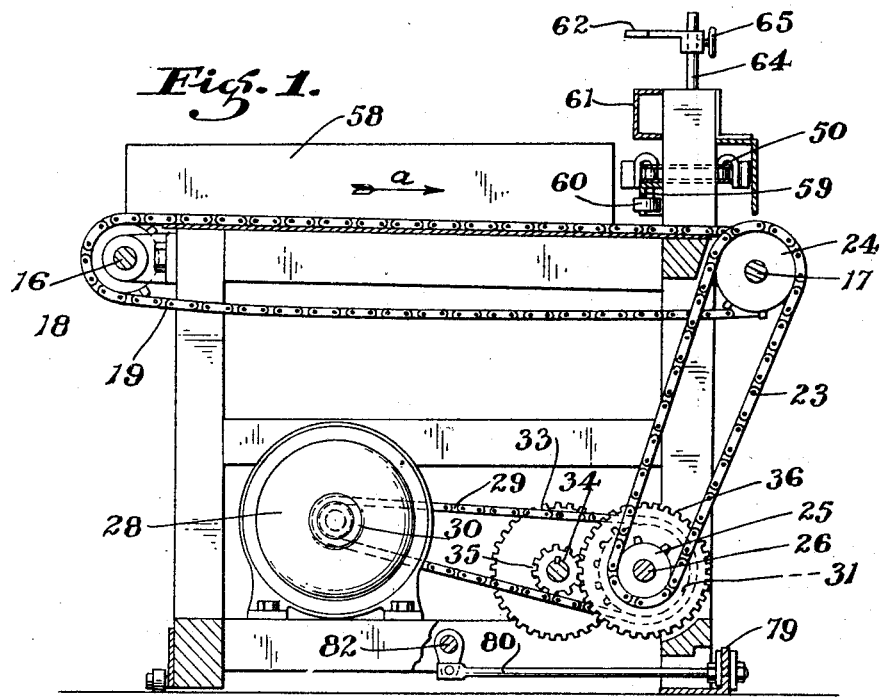
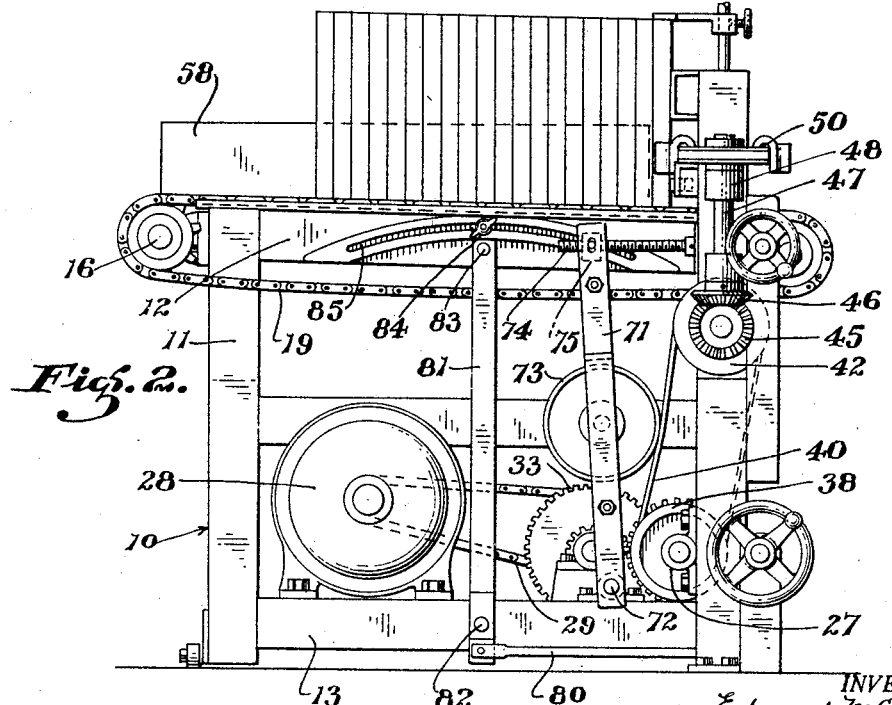
INVENTOR.
Edward McKuen.
BY Townsend, Loftus & Hett
ATTORNEYS.

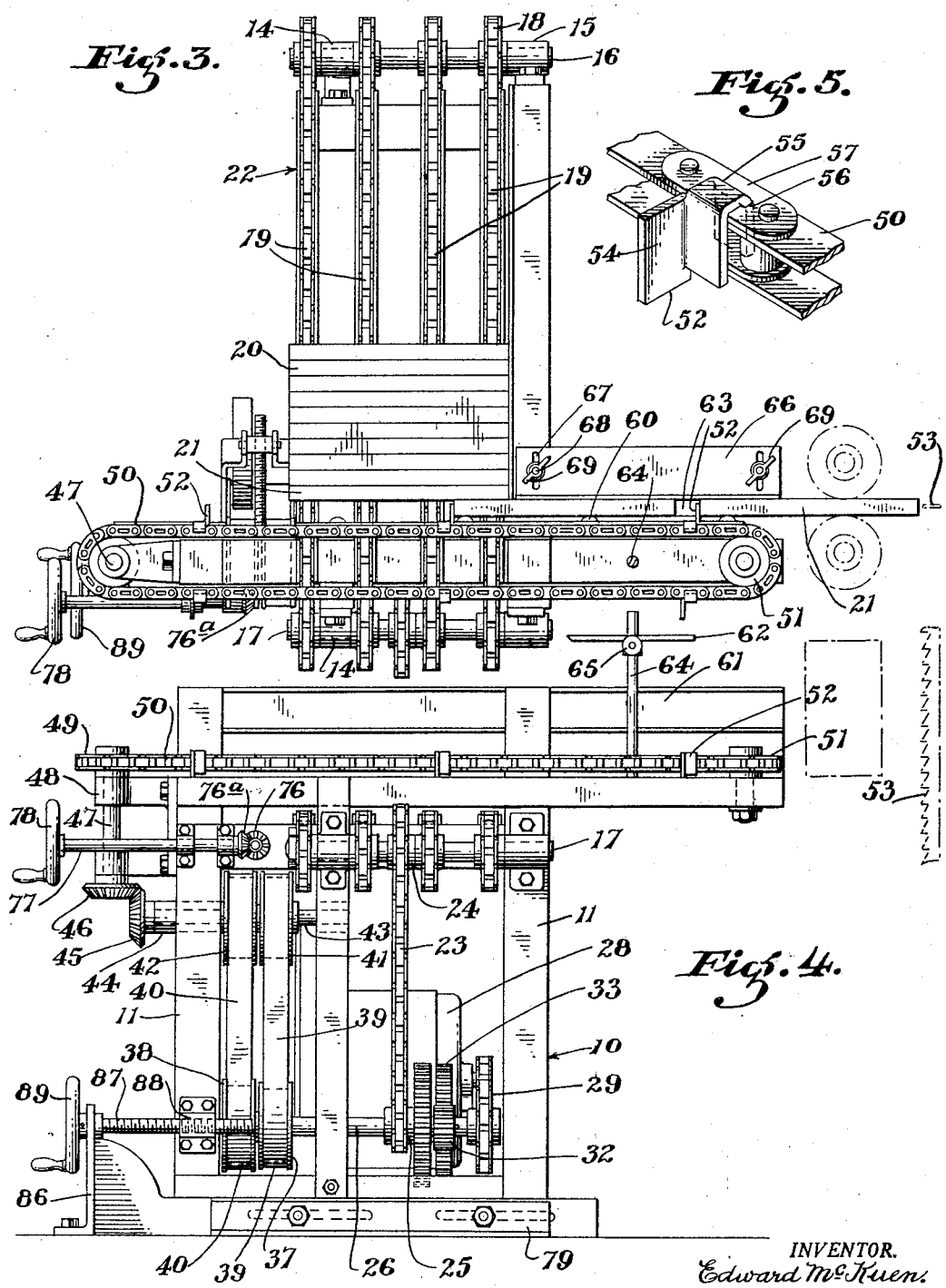

Patented Sept. 6, 1932

1,875,633

UNITED STATES PATENT OFFICE

EDWARD McKUEN, OF SAN FRANCISCO, CALIFORNIA

FEED FOR RESAW MACHINES

Application filed October 29, 1929. Serial No. 403,217.

This invention relates to wood working machinery, and particularly pertains to machinery for automatically feeding and resawing lumber.

It is the principal object of the present invention to provide a device, which may be used in conjunction with a saw to automatically feed pieces of lumber from a stack of lumber to the saw, and to successively and progressively feed the individual pieces of lumber against the saw in a manner to insure that the lumber will be split and that the saw will not at any time be overcrowded by the work being fed thereto.

The present invention contemplates a structure embodying a magazine in which a stack of lumber to be sawed may be placed, and in conjunction with which automatic means are provided to successively remove the foremost piece from the stack and to place it in cutting and feeding relation to a band saw.

The invention is illustrated by way of example in the accompanying drawings, in which—

Fig. 1 is a view in vertical section and elevation, showing the horizontal feed table with which the present invention is concerned and the driving means therefor.

Fig. 2 is a view in side elevation showing the assembled machine.

Fig. 3 is a view in plan showing the horizontal feed table and the transverse feed for delivering the work to the saw.

Fig. 4 is a view in end elevation showing the machine with which the present invention is concerned, and more particularly showing the details of the various drives therefor.

Fig. 5 is an enlarged fragmentary view in elevation, showing a portion of the transverse feed chain with a feed flight attached thereto.

Referring more particularly to the drawings, 10 indicates a sub-frame with which the present invention is concerned, including a plurality of vertical posts 11 and upper and lower connecting members 12 and 13. Mounted at opposite ends of the sub-frame structure are bearings 14 and 15 which rotatably support a pair of horizontally extending shafts 16 and 17. These shafts are disposed parallel to each other and are substantially in the same horizontal plane. Mounted upon the shafts is a plurality of pulleys 18, preferably flanged, and around which feed belts 19 extend. The upper run of each of the feed belts 19 is in the same horizontal plane and provides a suitable traveling support for a stack of lumber, generally indicated at 20 in Fig. 3 of the drawings.

It is to be understood that while the term "stack" has been employed, it is not to be inferred that the pieces of lumber are piled one upon the other but that they are stacked together horizontally so that the foremost piece 21 will be removed from the end of the stack and moved in a plane at right angles to the direction of travel of the lumber as it is advanced on the conveyor belts 19 which comprises the feed table 22.

The endless belts 19 forming the feed table 22 are simultaneously driven in the direction of the arrow $a$ by a chain 23 leading over a sprocket 24 on the shaft 17, which chain also passes around a sprocket 25 carried on a jack shaft 26. The jack shaft is disposed adjacent to the bottom of the sub-frame structure and is suitably mounted in bearings 27. The shaft is driven by a motor 28, supported upon the beams 13, and derives its power therefrom through a drive belt 29 which passes around a pinion 30 on the armature shaft of the motor and around a sprocket 31 on the jack shaft 26. The chain 23 is not directly driven from the shaft 26, due to the fact that it is desirable to advance the stack 20 on the feed table 22 at a relatively slow rate of speed. For that reason a pinion 32 is keyed upon the shaft 26 and is in mesh with a large gear 33 mounted upon a shaft 34. This shaft also carries a small pinion 35 rotating therewith and being in mesh with a large gear 36 freely mounted upon the shaft 26 and fixed to rotate with the sprocket 25.

The shaft 26 is also fitted with a pair of flanged pulleys 37 and 38 receiving belts 39 and 40, respectively. These belts pass around flanged pulleys 41 and 42 carried upon a horizontal shaft 43 which is mounted near the top of the sub-frame in bearings 44. At the outer end of the shaft 43 is a bevel gear 45 in constant mesh with a bevel gear 46 carried upon a vertical shaft 47. The vertical shaft is rotatably supported in brackets 48. At the upper end of the shaft 48 a horizontally disposed sprocket 49 is mounted. This sprocket receives the transverse feed chain 50 which is disposed in a horizontal plane parallel to and above that of the feed table 22 and travels around the sprocket 49 and a complementary sprocket 51 in a direction at right angles to the direction of travel of the advancing material upon the feed table 22.

By reference to Fig. 3 of the drawings, it will be seen that the run of the sprocket chain 50, adjacent to the feed table, defines the end of the travel of the advancing stack of material 20 on the feed table 22 and that flights 52, mounted upon the various links of the chain 50, will abut against the end of the foremost piece of work in the stack 20 and strip it from the end of the stack and move it in the general direction of the saw blade 53.

The feed flights 52 of the sprocket chain 50 are shown in detail in Fig. 5 of the drawings, where it will be seen that they include a lug 54, disposed vertically edgewise, and a U-shaped body portion 55 having a vertical leg which extends downwardly through a slot 56 in the side link 57 of the chain 50. Each of the side links of the chain is formed with such a slot, making it possible to detachably position the flights for accommodating pieces of work of variable length; it being understood, of course, that the work fed to the machine at any one setting is all of uniform length.

The side of the feed table adjacent to the saw is defined by a vertical sideboard 58 which terminates adjacent to the face of an end rail 59, more clearly shown in Fig. 1 of the drawings. This rail extends transversely of the path of travel of the advancing work and is disposed directly beneath the sprocket chain 50. The end rail 59 is provided with a plurality of rollers 60 rotating in a horizontal plane and tending to facilitate the transverse movement of the pieces of work without undue frictional resistance of the work against the rail 59 as the work advances therealong.

A guide member 61 also extends transversely of the end of the feed table 22, as shown in Fig. 2, and tends to hold the piece of work in vertical alignment as it is advanced by a flight 52 of the chain 50. While a steady rest 62 is disposed above the piece of work and holds it down as it advances transversely along the floor 63, this steady rest is adjustably supported upon a rod 64 and may be secured in its set position by a set screw 65. The individual advancing pieces of work 21 are held against lateral movement by an adjusting side rail 66 formed with slots 67, through which screws 68 extend and upon which wing nuts 69 are mounted. It will thus be evident that a throat, through which the individual pieces of work are fed to the saw, may be varied in width to accommodate pieces of work of different thickness.

In feeding the work from the end of the feed table to the saw it is necessary for the articles to be successively and positively fed. It may develop, however, that the hardness of the different pieces of work will vary so that it is not advisable to crowd the work into the cutting edge of the saw with the same non-resisting force at all times, and for that reason the belt 39, which transmits power from the jack shaft 36 to the horizontal shaft 43, is provided with a belt tightener structure as best illustrated in Fig. 2; and the pulley 38 for the belt 40 is made of a slightly larger diameter than the pulley 37 so that there will be some differential action to compensate for irregularities in the length of the various pieces of work as well as differences in the hardness of the work or the presence of knots.

The belt tightener structure is shown in detail in Fig. 2 of the drawings where it will be seen to comprise an oscillating arm 71 mounted on a pivot 72 at the bottom of the sub-frame and carrying a tightener pulley 73 at a point intermediate its ends. This pulley rests against one run of the belt 39 and varies the tension which may be imposed upon the belt as determined by manipulation of an adjusting screw 74 which extends through a nut 75 carried at the upper and free end of the oscillating bars 71.

The screw 74 extends through a suitable bearing in the frame and is fitted with a bevel gear 76 at its end, which gear is in mesh with a gear 76a carried upon an adjusting shaft 77. The adjusting shaft extends at right angles to the screw 74 and to a point beyond the side of the machine where it is fitted with a hand wheel 78 by which it may be rotated and the belt 40 variably tensioned to establish the normal slippage which might take place in the drive of the transverse chain 50.

In order to provide for an adjustment of my improved feeding device with respect to the saw to which the work is being fed, I have provided means whereby the complete apparatus may be moved bodily in a direction toward and away from the saw and also to the right or left thereof; the former adjustment being to adapt the machine to the feeding of work of different lengths and the latter adjustment being for the purpose of centering work of different thicknesses with respect to the saw. These means consist of a stationary foundation or tie plate 79 which is adapted to be permanently secured to a firm foundation.

For adjusting the machine with respect to the center of the saw there is attached to this tie plate a pair of rods 80 which extend horizontally along the lower part of the frame 10 and connect with a lever 81 (see Fig. 2) which is journaled upon a shaft 82.

At the upper end of the lever 81 there is provided a suitable handle 83 and a clamping nut 84 which, in cooperation with an arcuate slot 85, may be tightened to secure the lever 81 in any desired position so as to hold the machine at any point to which it is moved. For adjusting the machine toward and away from the saw, as above suggested, I provide upon the end of the tie plate 79 an upstanding flange 86, upon which there is journaled a screw 87. The screw 87 is threaded into a boss 88 secured to the frame 10 and it carries at this outer end a suitable crank or hand wheel 89, by means of which the screw may be turned to thus adjust the position of the apparatus with respect to its distance from the saw.

The operation of my device is as follows: It is assumed that the machine has been properly adjusted with respect to the saw 53 and that the work consisting of pieces of lumber 20 has been stacked upon the conveyor belts 19. When the motor 28 is energized the conveyor belts 19 will travel slowly toward the transverse feed chain 50, and as the flights 52 upon the latter chain engage the ends of the pieces of work 21, it will strip off the foremost piece of work and advance it toward the saw into engagement with the saw feeding mechanism (illustrated in dot and dash lines, Fig. 3).

While I have, for the sake of clearness and in order to disclose my invention so that the same can be readily understood, described and illustrated specific devices and arrangements, I desire to have it understood that this invention is not limited to the specific means disclosed but may be embodied in other ways that will suggest themselves, in view of this broad disclosure, to persons skilled in the art. It is believed that this invention is broadly new and it is desired to claim it as such so that all such changes as come within the scope of the appended claim are to be considered as part of this invention.

Having thus described my invention, what I claim and desire to secure by Letters Patent is—

In a lumber feeding device, the combination of a means for supporting lumber edgewise in a stack, a conveyor means extending at right angles to said stack and adapted to strip off the lumber one piece at a time from the end of said stack, said conveyor means consisting of an endless chain travelling in a horizontal plane and having vertically disposed slots in the links thereof, and flights having hooked ends thereon for removable engagement with said slots.

EDWARD McKUEN.